(12) United States Patent
Tong

(10) Patent No.: US 12,387,132 B1
(45) Date of Patent: Aug. 12, 2025

(54) ORCHESTRATION FOR BUILDING AND EXECUTING MACHINE LEARNING PIPELINES ON GRAPH DATA

(71) Applicant: Amazon Technologies, Inc., Seattle, WA (US)

(72) Inventor: Dylan Tong, Mercer Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1097 days.

(21) Appl. No.: 17/037,525

(22) Filed: Sep. 29, 2020

(51) Int. Cl.
*G06N 20/00* (2019.01)
*G06F 16/901* (2019.01)

(52) U.S. Cl.
CPC ......... *G06N 20/00* (2019.01); *G06F 16/9024* (2019.01)

(58) Field of Classification Search
CPC .................. G06F 16/9024; G06N 20/00
See application file for complete search history.

(56) References Cited

U.S. PATENT DOCUMENTS

| | | | | |
|---|---|---|---|---|
| 6,189,116 | B1 * | 2/2001 | Mongan | G06F 11/3684 |
| | | | | 714/39 |
| 6,378,088 | B1 * | 4/2002 | Mongan | G06F 11/3684 |
| | | | | 714/39 |
| 10,528,897 | B2 * | 1/2020 | Labat | G06Q 10/06 |
| 11,030,204 | B2 * | 6/2021 | Oks | G06F 16/284 |
| 11,030,484 | B2 * | 6/2021 | Walters | G06F 18/214 |
| 11,138,266 | B2 * | 10/2021 | Ding | G06F 16/906 |
| 11,210,578 | B2 * | 12/2021 | Scheidegger | G06N 3/086 |
| 11,216,749 | B2 * | 1/2022 | Kida | G06N 20/00 |
| 11,281,975 | B1 * | 3/2022 | Isaksson | G06F 11/3664 |
| 11,327,969 | B2 * | 5/2022 | Beresniewicz | G06F 16/2237 |
| 11,514,361 | B2 * | 11/2022 | Salonidis | G06F 3/04847 |
| 11,790,242 | B2 * | 10/2023 | Agrawal | G06N 5/01 |
| | | | | 706/13 |
| 2004/0128296 | A1 * | 7/2004 | Krishnamurthy | G06F 16/284 |
| | | | | 707/E17.118 |

(Continued)

FOREIGN PATENT DOCUMENTS

| | | | | |
|---|---|---|---|---|
| CA | 2932865 A1 | * | 12/2017 | |
| CN | 106779087 B | * | 2/2019 | G06N 20/00 |
| CN | 111736566 A | * | 10/2020 | G05B 23/0208 |

OTHER PUBLICATIONS

Nazar H., "What is Sagemaker Autopilot and How It Works", published on Dec. 5, 2019 to https://geniusee.com/single-blog/aws-introduced-automl-sagemaker-autopilot, retrieved Oct. 26, 2023. (Year: 2019).*

(Continued)

*Primary Examiner* — Shourjo Dasgupta
(74) *Attorney, Agent, or Firm* — S. Scott Foster; Kowert, Hood, Munyon, Rankin & Goetzel, P.C.

(57) ABSTRACT

Training and executing machine learning pipelines for graph data sets may be orchestrated. A request for machine learning pipelines on a graph data set may be received via a machine learning pipeline building system interface. The machine learning pipeline building system may generate a profile of the graph data set from characteristics determined from the data set by the machine learning pipeline building system. Machine learning algorithms may be selected according to the profile of the graph data set and may be used to generate an execution plan that is executes the machine learning pipeline.

20 Claims, 11 Drawing Sheets

(56) References Cited

U.S. PATENT DOCUMENTS

| | | | |
|---|---|---|---|
| 2006/0161403 A1* | 7/2006 | Jiang | G06N 20/00 703/2 |
| 2015/0026158 A1* | 1/2015 | Jin | G06F 16/90335 707/769 |
| 2015/0293994 A1* | 10/2015 | Kelly | G06F 16/35 707/740 |
| 2016/0034530 A1* | 2/2016 | Nguyen | G06F 16/24542 707/719 |
| 2016/0092595 A1* | 3/2016 | Kennedy | G06F 16/9024 707/723 |
| 2016/0189003 A1* | 6/2016 | Liu | G06F 18/24 382/165 |
| 2017/0017903 A1* | 1/2017 | Gray | G06T 11/60 |
| 2017/0364539 A1* | 12/2017 | Jacob | G06F 16/24547 |
| 2017/0372232 A1* | 12/2017 | Maughan | G06F 3/0482 |
| 2018/0018587 A1* | 1/2018 | Kobayashi | G06N 20/00 |
| 2018/0314735 A1* | 11/2018 | Liu | G06N 20/00 |
| 2019/0220746 A1* | 7/2019 | Liu | G06N 3/08 |
| 2019/0258719 A1* | 8/2019 | Baker | G06F 16/9538 |
| 2019/0361999 A1* | 11/2019 | Oks | G06F 16/25 |
| 2020/0012584 A1* | 1/2020 | Walters | H04N 21/8153 |
| 2020/0090075 A1* | 3/2020 | Achin | G06Q 30/0201 |
| 2020/0110590 A1* | 4/2020 | Lisuk | G06F 8/60 |
| 2020/0110843 A1* | 4/2020 | Dunjic | G06F 16/2455 |
| 2020/0184366 A1* | 6/2020 | Mandal | G06N 3/042 |
| 2020/0272923 A1* | 8/2020 | Banerjee | G06N 7/01 |
| 2020/0293940 A1* | 9/2020 | Chopra | G06F 8/34 |
| 2020/0380301 A1* | 12/2020 | Siracusa | G06N 20/00 |
| 2020/0387836 A1* | 12/2020 | Nasr-Azadani | G06N 20/20 |
| 2021/0055915 A1* | 2/2021 | Guo | G06F 3/0482 |
| 2021/0064932 A1* | 3/2021 | Wang | G06N 5/02 |
| 2021/0209500 A1* | 7/2021 | Hu | G06N 5/04 |

OTHER PUBLICATIONS

Martin Heller, "Review: Azure Machine Learning challenges Amazon SageMaker", published on Feb. 4, 2019 to https://www.infoworld.com/article/3338076/review-azure-machine-learning-challenges-amazon-sagemaker.html, retrieved Oct. 26, 2023. (Year: 2019).*

Shefali Aggarwal, "A Data Scientist's Guide to Model Deployment on SageMaker Using MLeap and Qubole Notebooks", published on Oct. 17, 2012 to https://www.qubole.com/blog/model-deployment-sagemaker-mleap-qubole, retrieved Oct. 26, 2023. (Year: 2012).*

"Hyperparameter Tuning", published on Apr. 14, 2020 to https://docs.determined.ai/latest/model-dev-guide/hyperparameter/_index.html, retrieved Aug. 23, 2024. (Year: 2020).*

Jason Brownlee, "Combined Algorithm Selection and Hyperparameter Optimization (CASH Optimization)", published on May 12, 2020 to https://machinelearningmastery.com/combined-algorithm-selection-and-hyperparameter-optimization/, retrieved Aug. 23, 2024. (Year: 2020).*

Bruno Almeida Pimental, etc., "A new data characterization for selecting clustering algorithms using meta-learning", published in Information Sciences, No. 477, pp. 203-219, 2019, retrieved Aug. 23, 2024. (Year: 2019).*

Fetahi Wuhib, etc., "A look at automated fault management with machine learning", published on Jun. 12, 2019 to https://www.ericsson.com/en/blog/2019/6/automated-fault-management-machine-learning, retrieved Sep. 10, 2024. (Year: 2019).*

Zixiao Shen, etc., "A Novel Meta Learning Framework for Feature Selection using Data Synthesis and Fuzzy Similarity", published May 21, 2020 to arXiv, retrieved Sep. 10, 2024. (Year: 2020).*

Tzvi Keisar, "Azure Machine Learning studio—a web interface for managing the machine learning lifecycle", published Jul. 15, 2020 to https://techcommunity.microsoft.com/t5/ai-machine-learning-blog/azure-machine-learning-studio-a-web-interface-for-managing-the/ba-p/1521780, retrieved Sep. 11, 2024. (Year: 2020).*

Microsoft Learn, "graph Module", teaching Azure Pipeline Run Graph, published on Dec. 11, 2018 to https://learn.microsoft.com/en-us/python/api/azureml-pipeline-core/azureml.pipeline.core.graph?view=azure-ml-py, retrieved Sep. 11, 2024. (Year: 2018).*

Leonard Lobel, "Demystifying the Multi-Model Capabilities in Azure Cosmos DB", published Sep. 10, 2018 to https://lennilobel.wordpress.com/2018/09/10/demystifying-the-multi-model-capabilities-in-azure-cosmos-db, retrieved Sep. 11, 2024. (Year: 2018).*

Will Velida, "Diving into Gremlin queries in Azure Cosmos DB", published Mar. 1, 2020 to https://towardsdatascience.com/diving-into-gremlin-queries-in-azure-cosmos-db-83eb1d7c6350, retrieved Sep. 11, 2024. (Year: 2020).*

Marko A. Rodriguez, "The Mechanics of Gremlin OLAP", published Apr. 26, 2016 to https://www.datastax.com/blog/mechanics-gremlin-olap, retrieved Sep. 11, 2024. (Year: 2016).*

Krishna Anumalasetty, "Spring Data Gremlin for Azure Cosmos DB Graph API", published Jul. 16, 2018 to https://azure.microsoft.com/es-es/blog/spring-data-gremlin-for-azure-cosmos-db-graph-api, retrieved Sep. 11, 2024. (Year: 2018).*

"Meta Graph", published on Sep. 23, 2020 to https://neo4j.com/labs/apoc/4.3/database-introspection/meta, retrieved Sep. 11, 2024. (Year: 2020).*

"Automated machine learning and MLOps with Azure Machine Learning", published on Oct. 28, 2019 to https://azure.microsoft.com/en-us/blog/automated-machine-learning-and-mlops-with-azure-machine-learning, retrieved Sep. 11, 2024. (Year: 2019).*

"Create dependencies among pipelines in yourAzure Data Factories", published on Aug. 5, 2019 to https://azure.microsoft.com/en-us/updates/create-dependencies-between-pipelines-in-your-azure-data-factories, retrieved Sep. 11, 2024. (Year: 2019).*

Katrina Wakefield, "A guide to the types of machine learning algorithms and their applications", published on Oct. 4, 2017 to https://www.sas.com/en_gb/insights/articles/analytics/machine-learning-algorithms.html, retrieved Apr. 7, 2025. (Year: 2017).*

Rajat Harlalka, "Choosing the Right Machine Learning Algorithm", published on Jun. 18, 2018 to https://medium.com/hackernoon/choosing-the-right-machine-learning-algorithm-68126944ce1f, retrieved Apr. 7, 2025. (Year: 2018).*

Vaidehi Joshi, "A Gentle Introduction To Graph Theory", published on Mar. 20, 2017 to https://medium.com/basecs/a-gentle-introduction-to-graph-theory-77969829ead8, retrieved Apr. 7, 2025. (Year: 2017).*

Tyler Elliot Bettilyon, "Types of Graphs", published on Feb. 6, 2019 to https://medium.com/tebs-lab/types-of-graphs-7f3891303ea8, retrieved Apr. 7, 2025. (Year: 2019).*

Piali Das, et al., "Amazon SageMaker Autopilot: a white box AutoML solution at scale," DEEM'20: Proceedings of the Fourth International Workshop on Data Management for End-to-End Machine Learning, Jun. 2020 Article No. 2, pp. 1-7, https://doi.org/10.1145/3399579.3399870.

William L. Hamilton, et al., "Representation Learning on Graphs: Methods and Applications," Copyright 2017 IEEE, Bulletin of the IEEE Computer Society Technical Committee on Data Engineering, pp. 1-23.

Zonghan Wu, et al., "A Comprehensive Survey on Graph Neural Networks," Journal of Latex Class Files, Aug. 2019, pp. 1-22, https://arxiv.org/pdf/1901.00596.pdf.

Ziwei Zhang, "Deep Learning on Graphs: A Survey," Journal of Latex Class Files, vol. 14, No. 8, Aug. 2015, pp. 1-24, https://arxiv.org/pdf/1812.04202.pdf.

Hongyun Cai, et al., "A Comprehensive Survey of Graph Embedding: Problems, Techniques and Applications," IEEE Transactions on Knowledge and Data Engineering, vol. XX, No. XX, Sep. 2017, pp. 1-20, https://arxiv.org/pdf/1709.07604.pdf.

Palash Goyal, "Benchmarks for Graph Embedding Evaluation," Preprint submitted to Information Sciences Aug. 28, 2019, pp. 1-18, https://arxiv.org/pdf/1908.06543v3.pdf.

Vijay Prakash Dwivedi, et al., "Benchmarking Graph Neural Networks," arXIV preprint: arXiv:2003.00982v3 [cs.LG] Jul. 2020, pp. 1-30.

* cited by examiner

ORCHESTRATION FOR BUILDING AND EXECUTING MACHINE LEARNING PIPELINES ON GRAPH DATA

BACKGROUND

Graph data structures provide efficient and accurate ways to represent knowledge in various domains. Moreover, various systems or services that collect and store data in graph data structures may find it desirable to make use of graph data structures in performing other tasks or operations. Machine learning techniques offer a way of making use of graph data to further enhance the operations of systems or services.

Figure 1:
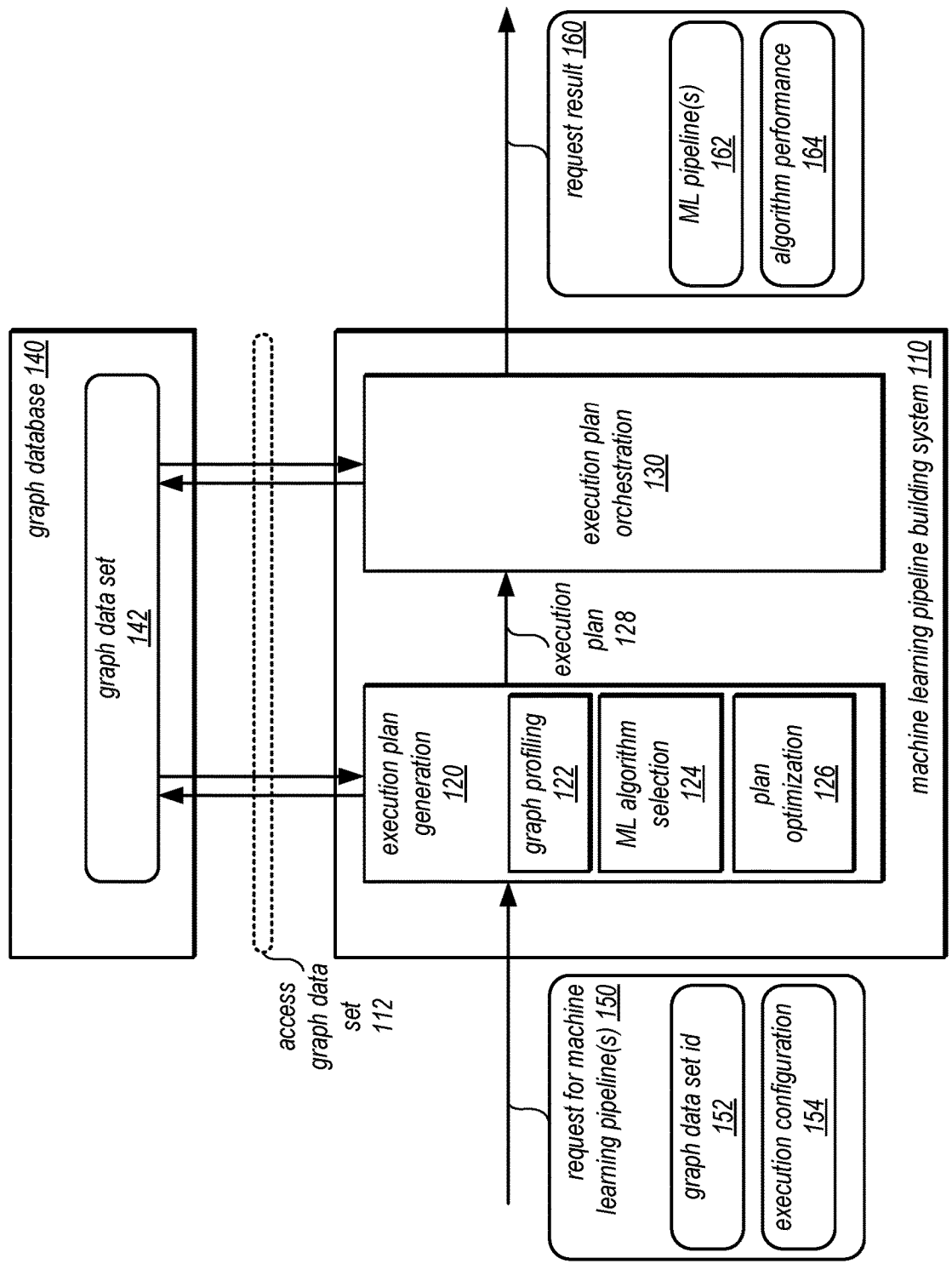
FIG. 1 illustrates a logical block diagram of orchestration for building and executing machine learning pipelines for graph data sets, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as described by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various techniques of orchestration for building and executing machine learning pipelines for graph data sets are described herein. Graph data structures that store data sets as graphs may provide a useful technique for structuring data that models both data values as nodes (e.g., with one or more attribute values) and the respective relationships between the data values (e.g., as one or more edges between nodes, which may also have zero or more attribute values). Because graph data structures model data, machine learning techniques can also be applied to determine new insights and implement new features or operations learned from the graphs. As graphs provide a variety of ways of structuring data, machine learning techniques to determine viable and useful machine learning algorithms for the graphs may have high processing and time costs for discovery and training. Moreover, the complexity of graphs can further increase the processing and time costs.

In various embodiments, techniques for orchestrating building and executing machine learning pipelines for graph data sets can lower the performance and time costs for building, training, and deploying machine learning models trained on graph data sets. For example, techniques for orchestrating building and executing machine learning pipelines for graph data sets can provide a framework to easily integrate new machine learning algorithms. In this way, new knowledge domain-specific techniques can be quickly deployed to obtain value from graph-structured data. Various performance optimizations, including automation, can be realized by leveraging artifact, feature, and other data reuse as well as systems that can support performant caching. Moreover, techniques for techniques for orchestrating building and executing machine learning models for graph data sets can increase the availability of machine learning insights from graph data sets by reducing the demand for machine learning engineers to build custom training pipelines for other users with domain expertise in the knowledge represented in the graph data sets or reducing the time to build and advance graph-based machine learning techniques (e.g., by supporting rapid prototyping, baselining, and benchmarking).

FIG. 1 illustrates a logical block diagram of orchestration for building and executing machine learning pipelines for graph data sets, according to some embodiments. Machine learning pipeline building system 110 may implement and/ or support various interfaces to handle both requests to train and build machine learning pipelines 150 on graph data sets 142 and access graph data sets 112 in graph database 140.

For example, a request 150 can include a graph data set identifier 152 and execution configuration 154 (e.g., which may include requested algorithms(s)) or other applications in which a machine learning pipeline may be deployed to build and train on graph data set 142. Machine learning pipeline building system 110 may be able to generate an execution plan (e.g., according to the various techniques discussed below with regard to FIGS. 3-5 and 7-9) performing graph profiling 122 on graph data set 142 (e.g., to determine various characteristics of graph data set 142), machine learning algorithm selection 124 (e.g., to include in the requested machine learning pipeline), and plan optimization 126 (e.g., to identify performance efficiencies to reduce building and executing costs).

Execution plan generation 120 may then provide the execution plan 128 to execution plan orchestration 130. Execution plan orchestration 130 may identify and instruct various processing resources (e.g., as discussed below with regard to FIGS. 3 and 7), which build and train machine learning pipelines efficiently according to execution plan 128, including accessing 112 graph data set 142 in graph database 140. Request result 160 may provide the trained model(s) 162 (e.g., for deployment or other serving options, as discussed below with regard to FIGS. 3, 7, and 10). Machine learning algorithm performance information 164 may be included to provide feedback for further adjusting pipeline building and executing (e.g., via user modifications to subsequent request configurations) and for selecting and analyzing the performance of different trained pipelines 162.

Please note that the previous description of a machine learning pipeline building system is a logical illustration of orchestration for building and executing machine learning pipelines for graph data sets and thus is not to be construed as limiting.

This specification begins with a general description of a provider network that implements multiple different services, including a machine learning service and graph database service, which may implement orchestration for building and executing machine learning pipelines for graph data sets. Then various examples of, including different components/modules, or arrangements of components/module that may be employed as part of implementing the machine learning service and graph database service are discussed. A number of different methods and techniques to implement orchestration for building and executing machine learning pipelines for graph data sets are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
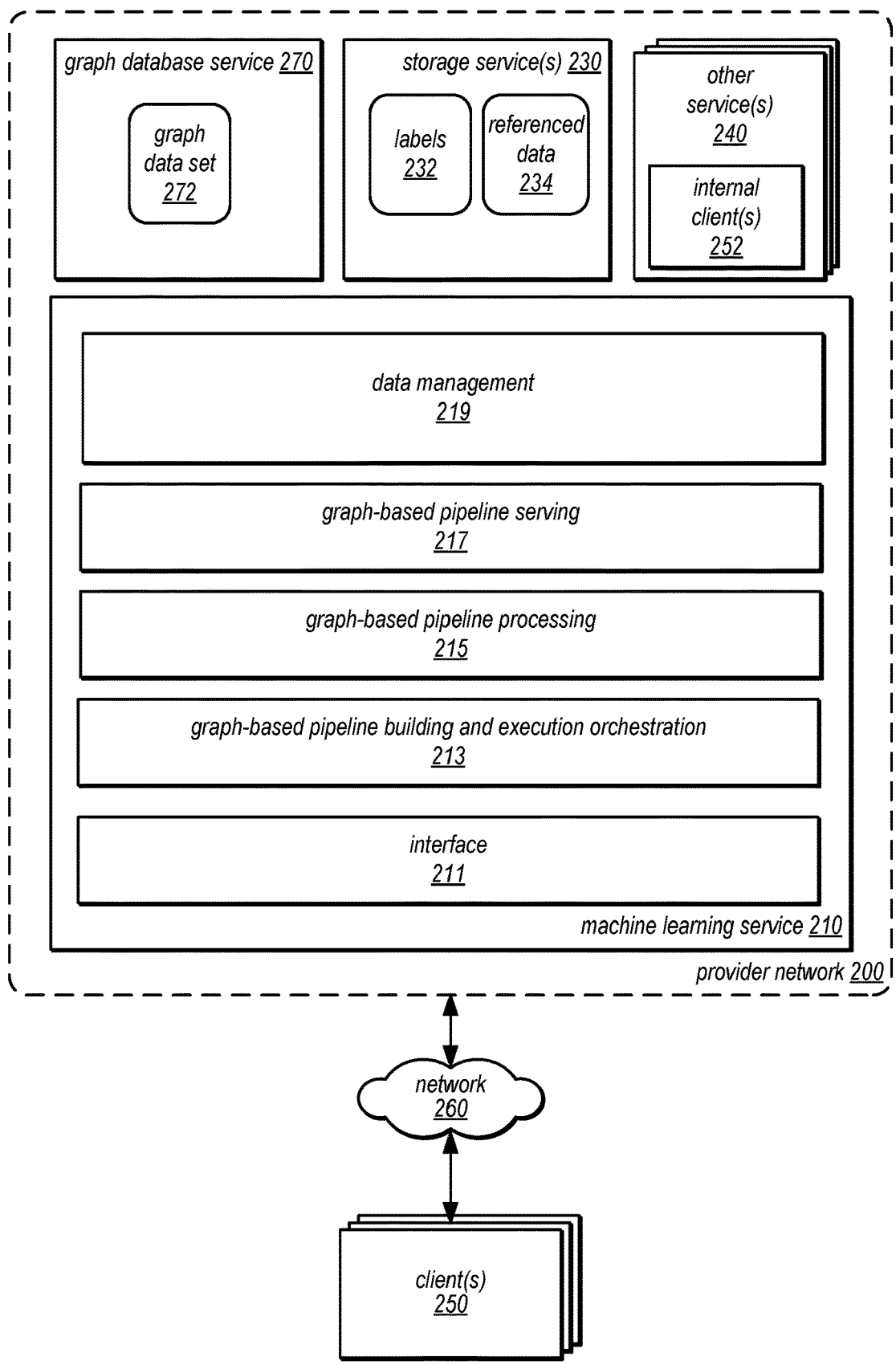
FIG. 2 illustrates an example provider network that may implement a machine learning service that performs orchestration for building and executing machine learning pipelines for graph data sets, according to some embodiments.

FIG. 2 illustrates an example provider network that may implement a machine learning service that performs orchestration for building and executing machine learning models for graph data sets, according to some embodiments. Provider network 200 may be a private or closed system or may be set up by an entity such as a company or a public sector organization to provide one or more services (such as various types of cloud-based storage) accessible via the Internet and/or other networks to clients 250, in one embodiment. Provider network 200 may be implemented in a single location or may include numerous data centers hosting various resource pools, such as collections of physical and/or virtualized computer servers, storage devices, networking equipment and the like (e.g., computing system 2000 described below with regard to FIG. 11), needed to implement and distribute the infrastructure and services offered by the provider network 200, in one embodiment. In some embodiments, provider network 200 may implement various computing resources or services, such as machine learning service 210, storage service(s) 230, graph database service 270, and/or any other type of network-based services 240 (which may include a virtual compute service and various other types of storage, database or data processing, analysis, communication, event handling, visualization, data cataloging, data ingestion (e.g., ETL), and security services), in some embodiments.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 11 and described below, in one embodiment. In various embodiments, the functionality of a given system or service component (e.g., a component of machine learning service 210 may be implemented by a particular node or may be distributed across several nodes. In some embodiments, a given node may implement the functionality of more than one service system component (e.g., more than one data store component).

Machine learning 210 may implement interface 211 to allow clients (e.g., client(s) 250 or clients implemented internally within provider network 200, such as a client application hosted on another provider network service like internal client(s) 252, to search for trained machine learning models on graph data sets, train and build machine learning models on graph data sets, and deploy machine learning models using a fully managed service. For example, machine learning service 210 may implement interface 211 (e.g., a graphical user interface, programmatic interface that implements Application Program Interfaces (APIs) and/or a command line interface), which may be implemented so that a client can request to build and train machine learning pipelines for graph data sets automatically, as discussed below with regard to FIG. 3. Interface 211 may allow a client to request the performance of training, deployment, or other machine learning service features, in various embodiments.

Machine learning service 210 may implement a control plane to perform various control operations to implement the features of machine learning service 210. For example, a control plane may monitor the health and performance of requests at different components, such as graph-based pipeline building and execution orchestration 213, graph-based pipeline processing 215, graph-based pipeline serving 217, and data management 219. If a node fails, a request fails, or other interruption occurs, the control plane may be able to restart a job to complete a request (e.g., instead of sending a failure response to the client). The control plane may, in some embodiments, may arbitrate, balance, select, or dispatch requests to different node(s), in various embodiments.

Machine learning service 210 may implement graph-based pipeline building and execution orchestration 213 to handle various requests, operations, and tasks to train, build, and/or execute machine learning models from graph data automatically, as discussed in detail below with regard to FIG. 3. Machine learning service 210 may implement graph-based pipeline processing 215 which may implement various nodes or other computing resources (e.g., services with different hardware configurations for performing different types of tasks or operations, such as GPU intensive, memory intensive, or CPU intensive tasks), as discussed in detail below with regard to FIG. 3. Machine learning service 210 may implement graph-based pipeline serving 217, which may store and deploy various machine learning pipeline trained on graph data to perform various tasks (e.g., according to the type of machine learning algorithm, such as clustering, regression, and/or classification, among others) as part of or for various applications. Machine learning service 210 may implement data management 219, in various embodiments, which may store various machine learning model data and training/build execution data for machine learning service 210, which may be available to other service components, as discussed below with regard to FIG. 3.

Data storage service(s) 230 may implement different types of data stores for storing, accessing, and managing data on behalf of clients 250 as a network-based service that enables clients 250 to operate a data storage system in a cloud or network computing environment. Data storage service(s) 230 may also include various kinds relational or non-relational databases, in some embodiments, data storage service(s) 230 may include object or file data stores for putting, updating, and getting data objects or files, in some embodiments. For example, one data storage service 230 may be an object-based data store that allows for different data objects of different formats or types of data, such as structured data (e.g., database data stored in different database schemas), unstructured data (e.g., different types of documents or media content), or semi-structured data (e.g., different log files, human-readable data in different formats like JavaScript Object Notation (JSON) or Extensible Markup Language (XML)) to be stored and managed according to a key value or other unique identifier that identifies the object. In at least some embodiments, data storage service(s) 230 may be treated as a data lake. For example, an organization may generate many different kinds of data, stored in one or multiple collections of data objects in a data storage service 230. The data objects in the collection may include related or homogenous data objects, such as database partitions of sales data, as well as unrelated or heterogeneous data objects, such as image data files (e.g., digital photos or video files) audio files and web site log files. Data storage service(s) 230 may be accessed via programmatic interfaces (e.g., APIs) or graphical user interfaces. As illustrated in FIG. 2, referenced data 234, which may be external to a graph data set (e.g., objects or documents) and referenced by the graph data set may be stored in storage services 230. In some embodiments, labels 232 (and/or other information for building and executing machine learning models on graph data sets) may be stored in storage services 230.

In various embodiments, graph database service 270 may store and provide access to graphs, such as graph data set 272. These graph data sets may be used to train machine learning models. As discussed in detail below with regard to FIG. 6, in some embodiments, graph database service 270 may implement techniques for performs orchestration for building and executing machine learning models for graph data sets.

Generally speaking, clients 250 may encompass any type of client that can submit network-based requests to provider network 200 via network 260, including requests for machine learning service 210 (e.g., a request to build and train a machine learning model on graph data, deploy a machine learning pipeline, etc.). For example, a given client 250 may include a suitable version of a web browser, or may include a plug-in module or other type of code module that can execute as an extension to or within an execution environment provided by a web browser. Alternatively, a client 250 may encompass an application (or user interface thereof) that may make use of machine learning service 210 to implement various features. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application that can interact directly with provider network 200. In some embodiments, client 250 may generate network-based services requests according to a Representational State Transfer (REST)-style network-based services architecture, a document- or message-based network-based services architecture, or another suitable network-based services architecture.

In some embodiments, a client 250 may provide access to provider network 200 to other applications in a manner that is transparent to those applications. Clients 250 may convey network-based services requests (e.g., access requests to read or write data may be via network 260, in one embodiment. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks, in one embodiment. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet.

Figure 3:
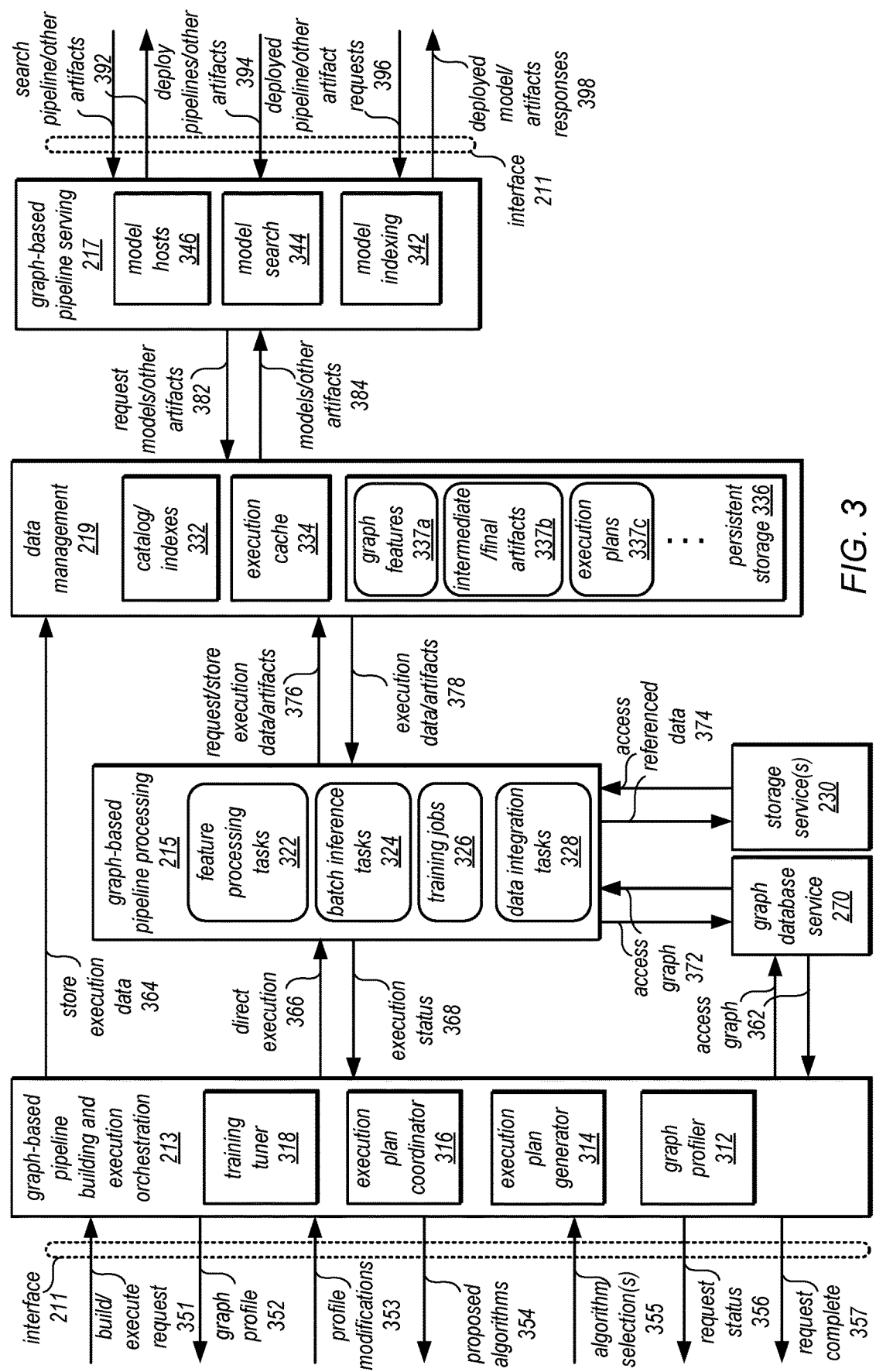
FIG. 3 illustrates a logical block diagram illustrating interactions with a machine learning service to handle requests to train and build machine learning pipelines on graph data sets, according to some embodiments.

FIG. 3 illustrates a logical block diagram illustrating interactions with a machine learning service to handle requests to train and build machine learning models on graph data sets, according to some embodiments. Interface 211 may support various requests to perform building and executing of machine learning models on graph data. For example, build/execute request 351 may be received via interface 211 at graph-based pipeline building and execution orchestration 213. Request 351 may include various parameters and/or other information, including an identifier and access information for a graph data set (e.g., graph name or identifier), various parameters for storing or deploying trained machine learning pipelines, and other configuration information, such as accessing externally referenced data.

Graph-based pipeline building and execution orchestration 213 may implement various features to execute build/execute request 351. For example, graph-based pipeline building and execution orchestration 213 may collect various data, perform analysis, generate execution plans and orchestrate performance of various other machine learning service 210 to handle build/execute request 351. For example, graph-based pipeline building and execution orchestration 213 may implement graph profiler 312. Graph profiler 312 may access 362 graph database 270 to analyze and collect data information used to generate the execution plan to provide the requested machine learning model(s). For example, graph profiler 312 may generate a graph profile that includes one or more graph characteristics, including the type characteristic of the graph data set (e.g., homogenous or heterogeneous), the attributes of nodes and edges of a graph data set (e.g., numerical or categorical, data skew or bias, missing values), referencing of external data sources (e.g., data objects such as documents, images, or information stored in another data store, like another database), size, density, direction, weighting, spatial, temporal, and/or communities, among others, according to various techniques discussed below with regard to FIG. 7. In some embodiments, the generated graph profile may be provided, as indicated at 352, via interface 211 and one or more profile modifications 353 may be performed to add, remove, or modify characteristics. Graph profiles (as well as user inputs via interface 211) may be stored as part of execution plans or other information in persistent storage 336, in some embodiments (e.g., as indicated at 364).

Figure 4:
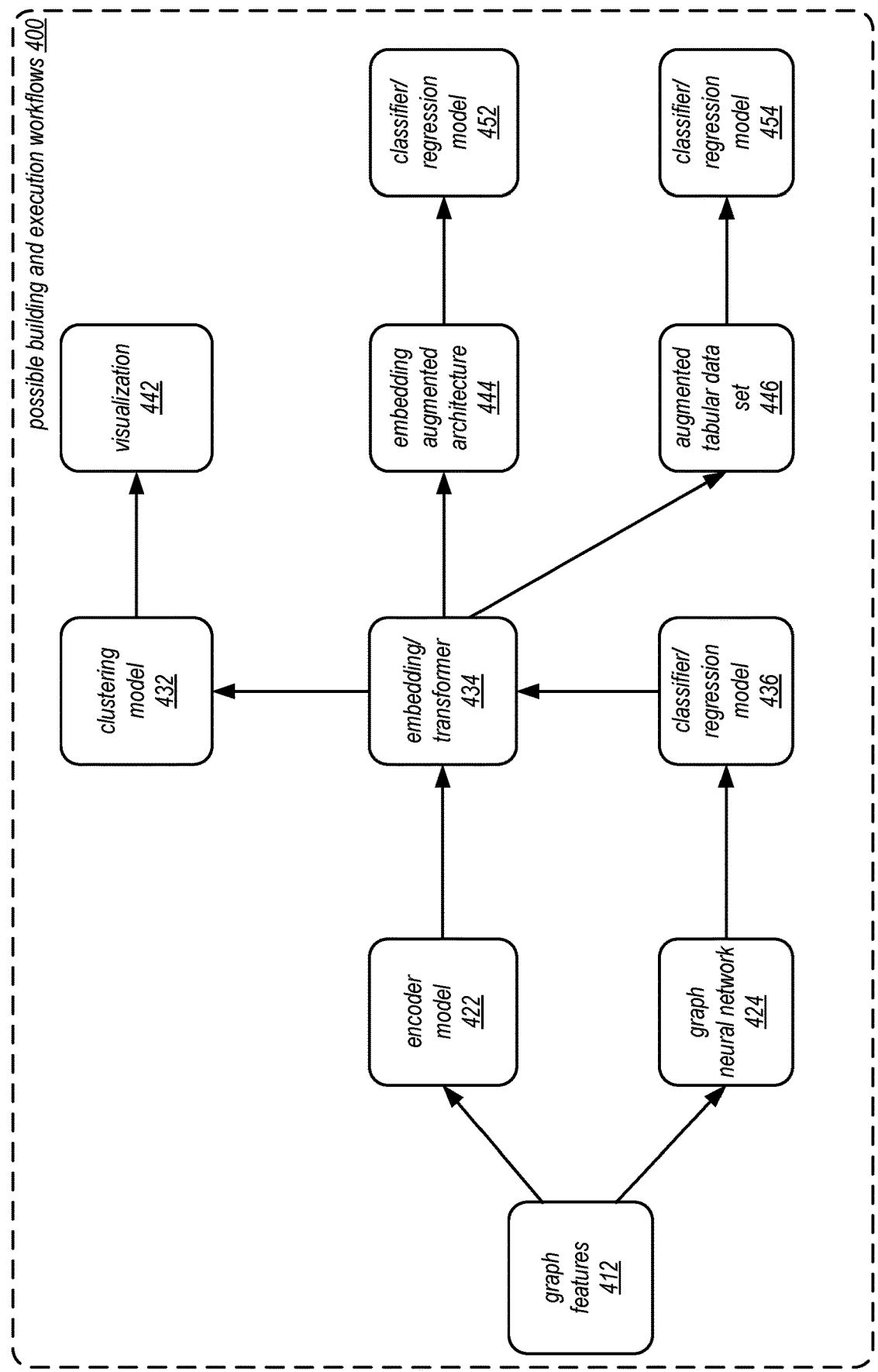
FIG. 4 illustrates a logical block diagram illustrating possible building and executing workflow for execution plan generation, according to some embodiments.

Graph-based pipeline building and execution orchestration 213 may implement execution plan generator 314 which may construct and optimize various execution plans including the operations to perform to generate machine learning models. In some embodiments, execution plan generator may identify and/or select machine learning algorithms to include in the pipeline based on the graph profile and provide them, as indicated at 354 via interface 211. Machine learning algorithm selection(s) 355 may be received, which may confirm, add, or change machine learning algorithms to use when generating the machine learning models. Execution plan generator 314 may generate the execution plan according to the identified machine learning algorithms. FIG. 4 illustrates a logical block diagram illustrating possible building and executing workflow for execution plan generation, according to some embodiments.

Possible building and executing workflows 400 may illustrate various types of workflows for generating different types of machine learning pipelines on graph data. For example, raw graph data may be received and then operation(s) to extract graph features, as indicated at 412 may be performed. For example, various types of feature extraction operations, like sampling techniques that perform random walks or random surf, local neighbor pre-aggregations, adjacency matrix, node-feature matrices, pre-processed coarse grained graphs, and domain specific features (e.g., entity-relation triplets for use in certain knowledge graphs and frameworks), among others may be extracted. These graph features may be stored by graph-based pipeline building and execution orchestration 213 (as indicated at 364) as graph features 337a in persistent storage 336 and/or in execution cache 334. In some embodiments, catalog or indexes 332 of graph data sets and machine learning pipelines may be updated to indicate the extraction of graph features (e.g., for locating features for reuse).

Graph features 412 may be used in various ways. For example, in some embodiments, graph features may be used to build an encoder model 411 (e.g., a DeepWalk, Node2Vec, or autoencoder, such as Structural Deep Network Embedding (SDNE) or Deep Neural Networks for Learning Graph Representations (DNGR). In some embodiments, graph features 412 may be used to build graph neural network (GNN) 414 (e.g., a Graph Convolutional Network (GCN)). Encoder model(s) 422 may be trained or tuned on graph data (and labeled data when appropriate) to generate an embedding/transformer for the graph data set. In some embodiments, graph neural network(s) 424 may be trained and/or tuned to generate a classifier or regression machine learning model, as indicated at 436. In some embodiments, embedding/transformer 434 can be extracted from regression classifier model 436.

In various embodiments, embedding/transformer 434 can be used to determine other machine learning models. For example, clustering model 432 may be generated from embedding/transformer 434 (e.g., as a k-means clustering model). In turn, clustering model 432 can be used to generate a visualization model 442. In some embodiments, a dimensional reduction (e.g., if an embedding is greater than 3 dimensions) may be applied, such as T-distributed Stochastic Neighbor Embedding (T-SNE). Embedding/transformer 434 can be used to build an augmented architecture 444 (e.g., by applying the embedding 434 with a K-nearest Neighbors (KNN) classifier or similarity model), which may then be trained or tuned to produce classifier/regression model 452. In some embodiments, the embedding of graph data sets may be integrated with non-graph data (e.g., tabular data) to produce an augment tabular data set 446, which may then be used train a classifier/regression model 454, in some embodiments. Various artifacts that are intermediate and/or final may be include the machine learning pipelines returned for a client request to train/build 341, such as classifier/regression model 436, embedding/transformer 434, clustering model 432, visualization 442, augmented tabular data set 446, classifier regression model 454, and/or classifier/regression model 452.

Figure 5:
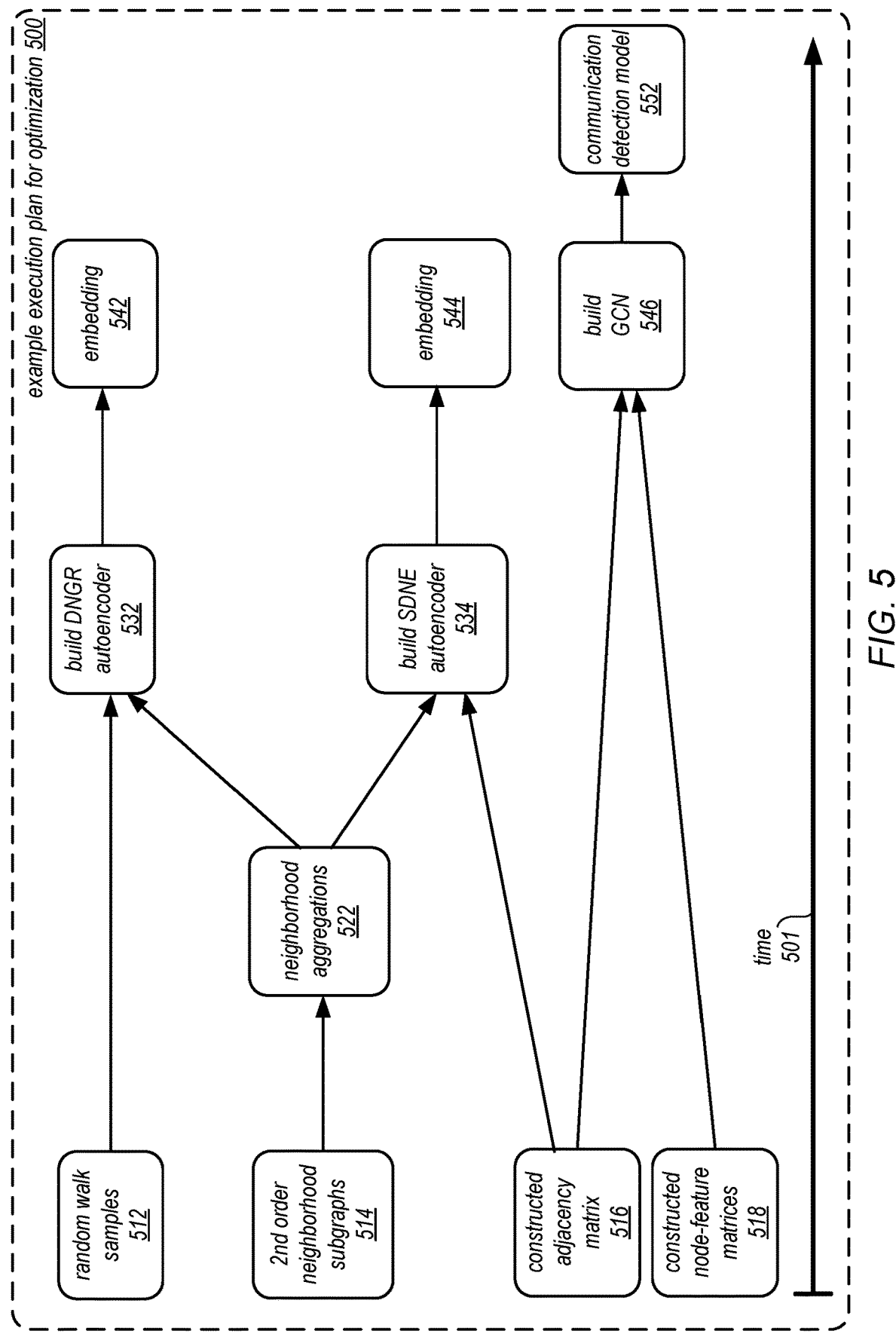
FIG. 5 illustrates a logical block diagram illustrating an example execution plan for optimization, according to some embodiments.

Turning back to FIG. 3, execution plan generator 314 may also implement execution plan optimization techniques, in some embodiments. For example, as discussed below with regard to FIG. 8, various modifications may be performed to a generated execution plan. FIG. 5 illustrates a logical block diagram illustrating an example execution plan for optimization, according to some embodiments. Execution plan 500 for optimization may show the performance of various operations ordered according to time 501. Parallelized operations, such as various feature extraction techniques like random walk samples, $2^{nd}$ order neighborhood subgraphs 514, constructed adjacency matrix 516 and constructed node feature matrices 518 may be ordered at the same time. Some operations with a common step, such as build DNGR autoencoder 532 and build SDNE autoencoder 534 may be combined, such that a single neighborhood aggregations operation 522 may be provided as a result to both later operations. In this way, embedding 542 and 544 can be generated from the different respective autoencoders 532 and 534 consuming a minimized number of resources by leveraging combined neighborhood aggregations. Similarly, constructed adjacency matrix 516 can be ordered to provide input to both build SDNE autoencoder 534 and build GCN 546, which can then be used to generate a communication detection model 552.

Turning back to FIG. 3, execution plan generator 314 may provide the optimized execution plan to execution plan coordinator 316. Execution plan coordinator may direct various execution tasks, utilizing graph-based pipeline processing 214 directly and/or utilizing training tuner 318. For example, graph-based pipeline processing 215 may implement various different resources (e.g., different types of nodes or other computing systems 2000 discussed below with regard to FIG. 11), which may have installed and configured the various software applications and hardware to perform feature processing tasks 322, batch inference tasks 324, training jobs 326, and/or data integration tasks 328. For example, some resources may be provided with greater CPU resources to handle CPU intensive tasks, while other resources in graph-based model processing 215 with greater GPU resources may handle GPU intensive tasks. In at least some embodiments, machine learning service may implement various techniques to provide scalable performance for the different tasks and jobs in order to allocate sufficient resources to complete the tasks and jobs within some service level specified in a service level agreement (SLA) and/or configuration information in build/execute request 351. As illustrated in FIG. 3, graph-based pipeline processing 215 may access graph 372 in graph database service 270 and access referenced data objects 374 in storage service(s) 230.

When performing the work, graph-based pipeline processing 215 may request and store various execution data and artifacts 376 from data management 219, which may return the requested execution data and artifacts 378 for performing tasks and jobs. Execution status information 368 (e.g., in progress, completed, failed, etc.) may be provided to execution plan coordinator 316 which may also provide a request status 356 and/or request completion indication 357 via interface 211.

Machine learning service 210 may implement data management 219 to store various information for performing training and build requests and completed artifacts and performance information (e.g., metrics), in various embodiments. For example, data management 219 may include long-term persistent storage for various data like graph features 337a (e.g., pre-process), intermediate or final artifacts 337b, execution plans, scripts, metadata or other information for training, building, deploying, and/or hosting machine learning pipelines trained on graph data. In some embodiments, execution cache 334 may be implemented. Execution cache 334 may be distributed, in some embodiments, to support large data sets and sharing across a distributed pipeline processing 215 environment. For example, shared artifacts and/or results can be quickly provided to other tasks via execution cache 334. Execution cache 334 may be tiered, in some embodiments, to minimize data transfer between RAM and GPU memory for high performance. In some embodiments, data management 219 may implement catalog and indexes to facilitate re-use and curation of graph features 337a, intermediate/final artifacts 337b, execution plans 337c, via query or other search operations.

In various embodiments, machine learning service 210 may implement graph-based pipeline serving 217. Interface 211 may support various requests to manually request and/or configure deployment. For example, requests to search for models or other artifacts 392 may be received via interface 211, and handled via model search 344 and model indexing 342, in various embodiments. Requests to deploy pipelines or other artifacts 394, in various embodiments, may be received. For example, requests 394 (or deployment configuration specified in other requests like build/execute request 351), may identify an endpoint deployment, where trained pipelines can be served as real-time endpoints or as batch processes for real-time and batch inference. A cataloged assess may be specified (instead of a direct deployment), in some embodiment to be quickly located and, when desirable, deployed or used for further pipeline building/training. A visualization may be provided as a deployment of a clustering pipeline, in some embodiments. In some embodiments, a pipeline can be deployed or otherwise served to transform other data, such as tabular data sets. For example, embeddings can be used to transform a graph data set into a low dimension vector that can be joined with tabular data sets, allowing the graph data to be easily reused in by other machine learning systems that can handle tabular data. In such embodiments, further information such as access information and/or data manipulation descriptions (e.g., how to join) may be provided as part of serving a machine learning model.

Build and trained machine learning pipelines may be deployed (e.g., according to configuration information specified in request 394 on model hosts 346 which may request 382 and obtain 384 the models/artifacts to deploy. In some embodiments, interface 211 may support deployed pipeline requests 396 and responses 398 (e.g., to perform various tasks). In various embodiments, graph-based pipeline serving 217 may implement automatic deployment techniques like those discussed below with regard to FIG. 10.

Figure 6:
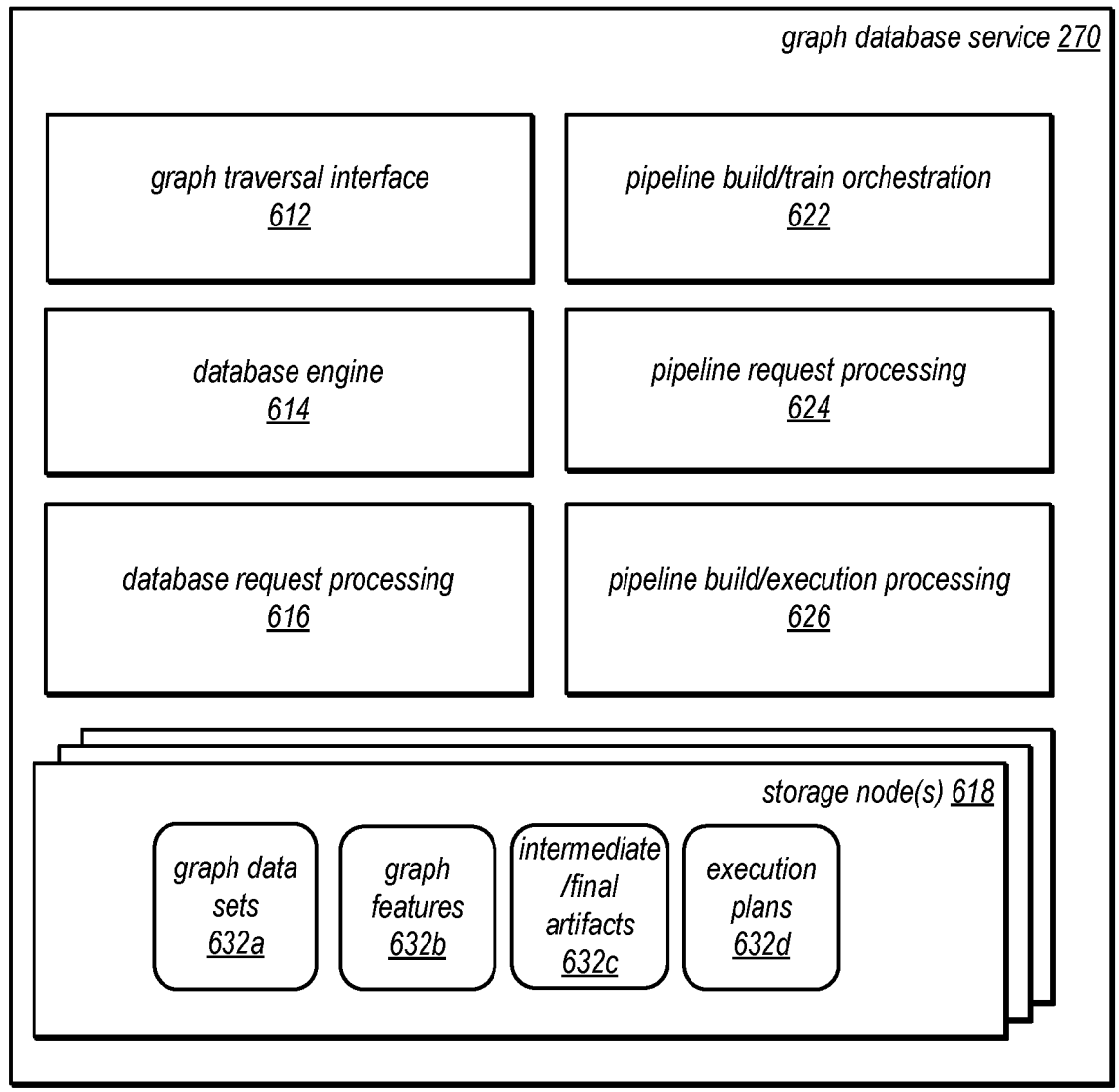
FIG. 6 illustrates a logical block diagram illustrating an example of a graph database service that implements orchestration for building and executing machine learning pipelines for graph data sets, according to some embodiments

Although a machine learning system or service, like machine learning service 210 can implement orchestration for building and executing machine learning pipeline, other systems may also integrate such techniques. For example, a graph database may implement orchestration techniques for building and executing machine models on graph data sets in order to leverage proximity and other efficiencies by support machine learning within the database itself. FIG. 6 illustrates a logical block diagram illustrating an example of a graph database service that implements orchestration for building and executing machine learning models for graph data sets, according to some embodiments.

Graph database service 270 may implement graph database access and management features, in various embodiments. For example, graph traversal interface 612 may provide API support for various traversals or other searches (e.g., tracing inheritance of given node to the root) in a graph as well as graph database languages (e.g., Graph Query Language (GQL)). Graph database engine 614 may handle requests to store and/or update graphs (e.g., operations to add data as new nodes, add edges, modify/node edge attributes, etc.). Database request processing 616 may provide resources for handling the workload of graph traversals and engine operations into storage nodes 618 to update graph data sets 632a.

In order to prevent interference with graph data access and management workloads, graph database service 270 may separately implement some resources for handling training, building, and deploying machine learning pipelines generated from graph data while leverage a common back end data store (e.g., storage nodes 618). For example, pipeline build/train orchestration 622 may implement similar techniques to those discussed above with regard to graph-based pipeline building and execution orchestration 213 in FIG. 3 (e.g., profiling, plan generating, plan execution, and training tuning). Pipeline build/train processing 626 may implement features similar to graph-based model processing 215 in FIG. 3 above, whereas pipeline request processing 624 may implement features similar to graph-based pipeline serving 217 in FIG. 3 above. Storage nodes 618 may store graph features 632b, intermediate/final artifacts 632c, and execution plans 632d similar to data management 219 discussed in FIG. 3 above.

Although FIGS. 2-6 have been described and illustrated in the context of a provider network implementing a machine learning service and graph database service, the various components illustrated and described in FIGS. 2-6 may be easily applied to other model training systems that can access and coordinate performance of building and executing machine learning models on graph data. As such, FIGS.

2-6 are not intended to be limiting as to other embodiments of orchestration for building and executing machine learning models for graph data sets.

Figure 7:
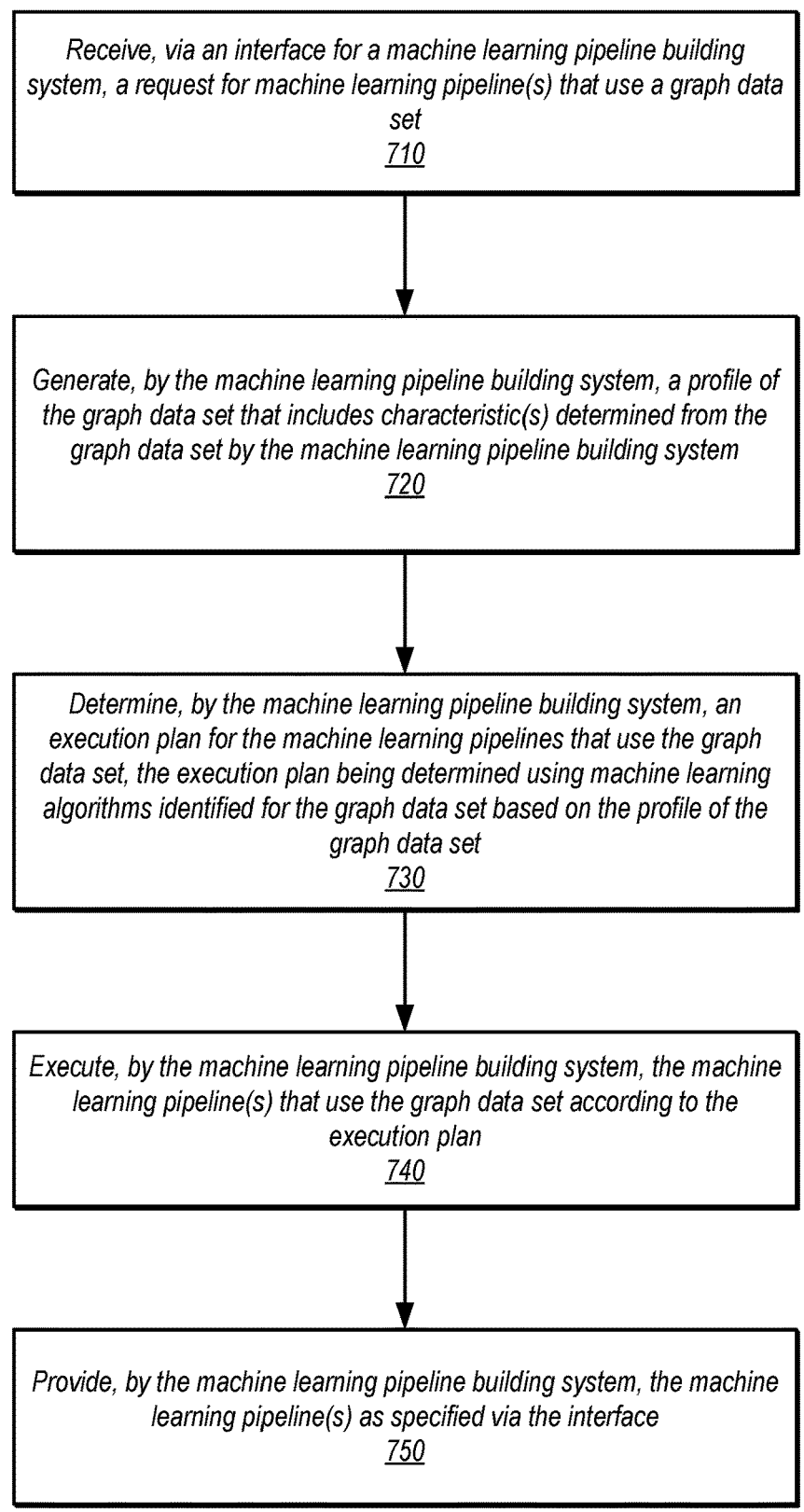
FIG. 7 illustrates a high-level flowchart of various methods and techniques to implement orchestration for building and executing machine learning pipelines for graph data sets, according to some embodiments.

FIG. 7 illustrates a high-level flowchart of various methods and techniques to implement orchestration for building and executing machine learning models for graph data sets, according to some embodiments. Various different systems and devices may implement the various methods and techniques described below, either singly or working together. Therefore, the above examples and or any other systems or devices referenced as performing the illustrated method, are not intended to be limiting as to other different components, modules, systems, or devices.

As indicated at 710, a request for machine learning pipeline(s) that use a graph data set may be received via an interface for a model training system, in some embodiments. For example, similar to the discussion above with regard to FIG. 3, the request may be formatted according to various types of interfaces implemented by the model training system, such as various command line, GUI, API, and/or other types of interfaces. The request may include various parameters and/or other information, including an identifier and access information for a graph data set (e.g., graph name or identifier), various parameters for storing or deploying trained machine learning pipelines, and other configuration information, such as accessing externally referenced data.

As indicated at 720, a profile of the graph data set may be generated that includes characteristic(s) determined from the graph data set by the machine learning pipeline building system, in various embodiments. For example, as discussed above with regard to FIGS. 1 and 3, the model training system, may query, scan, read, or otherwise interact with a graph database that stores the graph data set in order to determine the characteristics of the graph data set. Various classification techniques or analyses may, for instance, determine the type characteristic of the graph data set. For example, the graph data set may be homogenous, such that each node and edge of the graph may be of a single type. A social network may be one example of a homogenous graph type as each node may be a use and each edge may indicate a relationship between users. In another example, the type characteristic of the graph data set may be heterogeneous, where multiple node types and/or edge types may be implemented. For instance, an e-commerce customer base may be represented as a heterogeneous type of graph as nodes could be users, products, or other entities. Sampling techniques, traversing the graph, or schema information (or other metadata) may be accessed in order to determine the type characteristic of the graph data set.

In some embodiments, the attributes of nodes and edges of a graph data set may be determined as another characteristic in the graph profile of a graph data set. For example, an attribute type may be numerical or categorical, which may indicate what types of machine learning models can process the attribute type (e.g., by indicating potential features and/or target labels). Categorical data may, for instance, be one-hot encoded in order to be consumed for processing in a machine learning model. In some embodiments various statistical analyses of values for the data of graph data set may be determined as a characteristic in a graph profile. For example, data skew or bias of a graph data set may be detected, which may trigger additional processing techniques (e.g., sampling) to flag, drop, or correct for the skew or bias. Missing values may, in some embodiments, be determined for a graph data set via imputation techniques, or dropped from consideration in machine learning models. In some embodiments, some model types may not utilize node or edge features. In such scenarios, the presence of (or selection of attributes via the interface) may determine or influence which model types can be used. Like the type characteristic, the attributes of nodes and edges of a graph data set may be determined using schema or other metadata maintained for a graph data set, walking or otherwise traversing the graph data set, and/or sampling values on the graph data set. In some embodiments, missing values, bias, or skewered data can be determined using various data profiling techniques (e.g., statistics, pattern recognition, and so on).

In some embodiments, a characteristic of a graph data set may be the referencing of external data sources (e.g., data objects such as documents, images, or information stored in another data store, like another database). For example, identifying potential external references may be performed using probabilistic techniques (e.g., using machine learning models trained to detect references) or rules-based approaches that evaluate, for example, uniform resource indicators (URIs), and/or references to unstructured data formats (e.g., .txt, .png, and so on). In some embodiments, confidence thresholds may be applied for potential external references which may be verified via modifications to graph profile characteristics, as discussed above.

In some embodiments, the graph profile may include other graph characteristics, such as size, density, direction, weighting, spatial, temporal, and/or communities, among others. A size characteristic may, in some embodiments, may constrain the types of machine learning models that can be built and trained from the machine learning model (e.g., by impact processing cost and execution time). Graph databases may maintain schema information that may include size information. In some embodiments, various descriptive information like size may be calculated or supported by graph databases commands or operations. In some embodiments, size could be determined by traversing the graph data set or estimated by sampling the graph data set.

A density characteristic can influence performance of different model types, which may vary in effectiveness according to density. As with size, density may be calculated or supported by graph databases commands or operations. In some embodiments, density could be determined by traversing the graph data set or estimated by sampling the graph data set.

A direction characteristic may indicate whether edges in a graph data set have direction (e.g., some edges may be one-way). Some edges may not have direction. Direction of edges could influence or effect the performance of data preparation and/or model types, or indicate whether a model type should be selected that accounts for direction. Direction may be calculated or supported by graph databases commands or operations. In some embodiments, direction could be determined by traversing the graph data set or estimated by sampling the graph data set.

A weighting characteristic may indicate whether edges in a graph data set have an equal or different weight. As with density, could influence or effect the performance of data preparation and/or model types, or indicate whether a model type should be selected that accounts for weighting. Weights may be calculated or supported by graph databases commands or operations. In some embodiments, weighting could be determined by traversing the graph data set or estimated by sampling the graph data set.

In some embodiments, a spatial characteristic for graph data sets may be determined. For example, graph data sets may define or be related to spatial structures which can be accounted for by some model types. Schema or metadata may indicate spatial characteristics of a graph data set, in some embodiments.

In some embodiments, a temporal characteristic for graph data sets may be determined. For example, some model types may account for graph data with a temporal dimension, which may encode or consider how a graph data structure changes over time. Some knowledge domains, such as biology or chemistry, may make use of this temporal information. Temporal data may be obtained from a schema or other metadata of a graph database, in some embodiments. In some embodiments, database snapshots or back-ups may be used to determine temporal characteristics.

In some embodiments, communities or sub-graphs characteristics for a graph data set may be determined. For example, communities or sub-graphs characteristics may be tracked in a schema (or identified via the interface via graph profile edits), which may be used for model types that consume or otherwise use sub-graphs (or simplify the performance of graph pre-processing/supervision based model types), in some embodiments.

As discussed above with regard to FIG. 3, in at least some embodiments, some (or all) of a graph profile may be provided via the interface for confirmation, approval, editing, or request for further information. For example, proposed recognition of external data objects may be confirmed. In some embodiments, missing or requests for further characteristics that are not determined by the model training system automatically, can be provided via the interface (or otherwise requested via the interface). Corrections to erroneous characteristic determinations may be made via the interface to the graph profile, in some embodiments.

As indicated at 730, an execution plan for the machine learning pipeline(s) on the graph data set may be determined, in various embodiments. The execution plan may be determined using machine learning algorithm(s) identified for the graph data set based on the profile of the graph data set, in some embodiments. For example, as discussed below with regard to FIG. 8, various constraints, and/or other considerations may be made with respect to choosing machine learning algorithms for a graph data set. Machine learning algorithms may include various categories, such as supervised, semi-supervised, and unsupervised techniques, operate at different levels with respect to graph data, such as nodes, edges, sub-graphs/communities, or graph, perform different types of tasks, such as classification, regression, clustering, or embedding generation. Different machine learning algorithms may use (or not at all) different amounts of labeled data. Artifacts (or byproducts) of the machine learning algorithms may include an embedding, an encoder, or transformer, in some embodiments. For example, supervised machine learning algorithms may operate on a node level to perform classification tasks, in some embodiments. Semi-supervised machine learning algorithms may operate on an edge level to perform regression tasks, in some embodiments. In some embodiments, unsupervised machine learning algorithms may operate on a sub-graph, community, or graph level to perform classification tasks (or generate embeddings). Various combinations of machine learning algorithms may be supported, in some embodiments, including in the one (or more) requested machine learning pipelines, and thus automated selection techniques as well as selection via interface may be performed for machine learning algorithms. In some embodiments, different machine learning algorithms that are identified may trigger a request (or lookup in configuration information) labels for the data (or use candidate attributes identified in the graph profile).

As discussed above with regard to FIGS. 4 and 5, various possible workflows to build and train identified models may be used. As discussed in detail below with regard to FIG. 9, techniques to optimize performance of the execution plan (e.g., by identifying sharing opportunities and/or other performance efficiencies). In some embodiments, various other configurations or options that are specified for the request to train and build the machine learning pipeline(s) may be accounted for in the execution plan (e.g., including configuration information to configure hyperparameter ranges, custom evaluation metrics, or other default automation override information). For example, access to external sources of data for reference data objects and operations to process the referenced data, like documents or images, may be included as operations in the execution plan. Operations to access data sources, select a transformer to process data objects from the data sources, such as transformers like BERT for text documents and/or pre-trained neural networks (e.g., Convolutional Neural Networks (CNN) trained for images). In some embodiments, configuration information may specify constraints like maximum cost and/or training time for performing the request (e.g., a time limit and building and executing the machine learning pipeline(s)).

As indicated at 740, the machine learning pipeline building system may execute the machine learning pipeline(s) that use the graph data set according to the execution plan, in various embodiments. For example, various types of training resources or other tasks, as discussed above with regard to FIG. 3, may be requested, invoked, provisioned, started, or otherwise used. In some embodiments, hyperparameter tuning or other techniques may be performed to train the machine learning model(s).

As indicated at 750, the model training system may provide the machine learning pipeline(s) as specified via the interface, in some embodiments. For example, the pipeline(s) may be stored for subsequent deployment, cataloged (or otherwise indexed). In some embodiments, the machine learning pipeline(s) may be deployed, according to deployment configuration information. As discussed in detail below with regard to FIG. 10, machine learning algorithms(s) in the pipeline(s) may be automatically selected for deployment.

Figure 8:
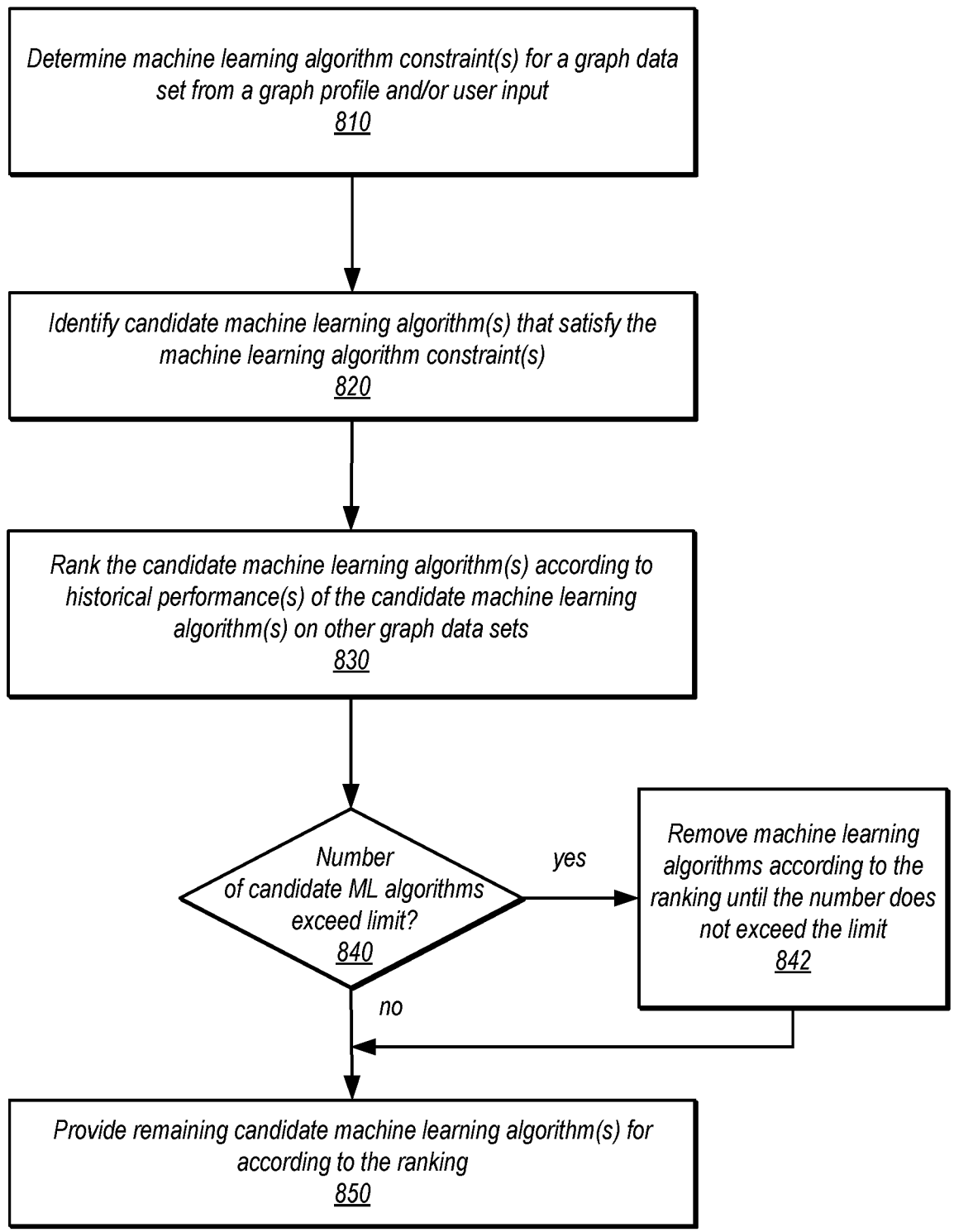
FIG. 8 illustrates a high-level flowchart of various methods and techniques to implement selecting machine learning algorithms for a graph data set, according to some embodiments.

FIG. 8 illustrates a high-level flowchart of various methods and techniques to implement selecting machine learning algorithms for a graph data set, according to some embodiments. As indicated at 810, machine learning algorithm constraint(s) may be determined for a graph data set from a graph profile and/or user input, in some embodiments. For example, graph characteristics may implicate limitations on the type of machine learning algorithm that can be used (e.g., because the amount of data in the graph, the modeling of the data, etc.). User constraints may be provided via a model training system interface, such as constraints on execution time or costs. In various embodiments, candidate machine learning algorithm(s) may be identified that satisfy the determined machine learning algorithm constraints, as indicated at 820. For example, machine learning algorithms that do not accept or account for some characteristics of a profile of the graph data set may be excluded from consideration. Some performance constraints may be determined, in some embodiments. For example, service level agreements may specify performance building/training and/or task performance, which may not be met by some machine learning algorithms.

As indicated at 830, the candidate machine learning algorithms(s) may be ranked according to historical performance(s) of the identified machine learning algorithms(s) on other graph data, in some embodiments. For example, a model training system may track performance information (e.g., for training and/or deployed models) for other graph data sets. A benchmark system may, in some embodiments for example, evaluate machine learning algorithms by performance on graph characteristics like size and density. Different types of benchmark systems for different types of characteristics may be implemented, in some embodiments.

In some embodiments, a number of machine learning algorithms that can be selected may be limited, according to a training limit, as indicated at 840. For example, a user can specify a training limit via the interface and/or a training system may impose a limit on requests to train and build machine learning pipelines. If the limit is exceeded, then identified machine learning algorithm(s) may be removed according to the ranking (e.g., starting from least ranked candidate machine learning algorithms) until candidate machine learning algorithms no longer exceed the training limits, as indicated at 842. As indicated at 850, remaining machine learning algorithm(s) may be provided for building and executing according to the ranking, in some embodiments. For example, the machine learning algorithms may be provided in ranked order. In some embodiments, the ranked order may be indicated via a user interface which allows a user to specify which candidate machine learning algorithms may be included in the execution plan, as discussed above with regard to FIG. 3.

Figure 9:
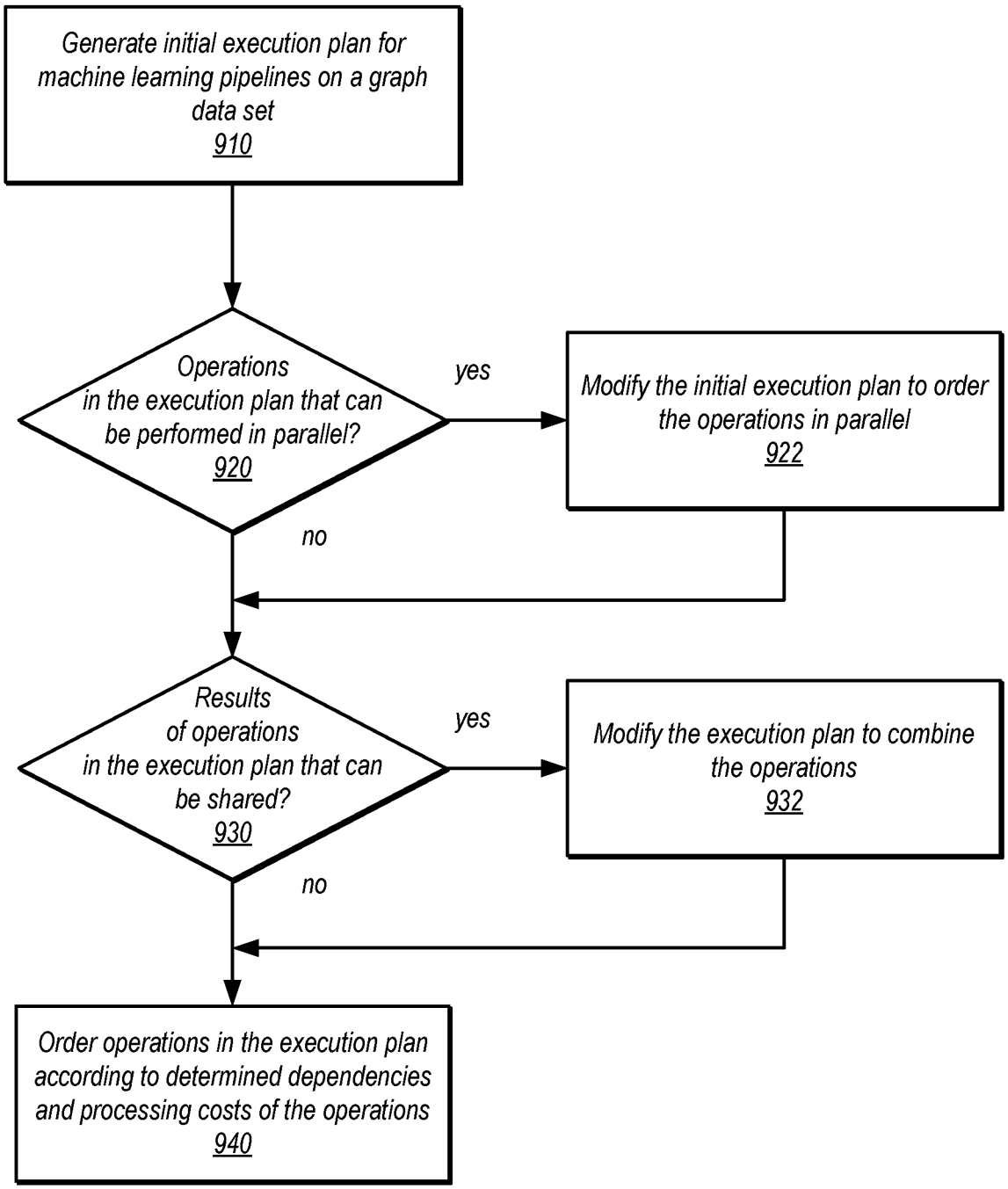
FIG. 9 illustrates a high-level flowchart of various methods and techniques to implement optimizing execution plans for training and building machine learning pipelines on graph data sets, according to some embodiments.

As discussed above with regard to FIG. 5, various optimizations can be applied to improve the performance of execution plans. FIG. 9 illustrates a high-level flowchart of various methods and techniques to implement optimizing execution plans for training and building machine learning models on graph data sets, according to some embodiments. As indicated at 910, an initial execution plan to build and train machine learning pipelines may be generated, in some embodiments. For example, separate workflows for machine learning pipelines may be generated and then grouped as a single initial execution plan.

As indicated at 920, operations in the execution plan may be evaluated for parallelism. For example, various feature processors or other techniques that operate on raw data may have no dependencies between them and as such may be performed in parallel. As indicated by the positive exit from 920, the initial execution plan may be modified to order the identified operations in parallel, in some embodiments.

As indicated at 930, operations in the execution plan may be evaluated for shared results. For example, various feature processor results can be input into multiple different building and/or training models. As indicated by the positive exit from 930, the initial execution plan may be modified to combine the identified operations in the execution plan, in some embodiments.

As indicated at 940, operations in the execution plan may be ordered according to determined dependencies and/or processing costs of the operations, in some embodiments. For example, cost-based optimization techniques compare different alternative orderings, determine a total cost for each ordering operations and then select the least costly. Cost may be determined from various statistics collected for the graph data set or historical costs of similar arrangements of operations on other data sets. In some embodiments, dependencies may also affect the ordering operations. A combined operation may, for instance, be ordered earlier than operations that are only input to one later operation. In some embodiments, optimization may include eliminating one or more operations that are underperforming in comparison to other algorithms included in a machine learning pipeline when being executed in parallel. In this way, runtime pipeline pruning may be performed to eliminate algorithms based on poor results with respect to metrics measured over a number of training runs (e.g., over a statistically significant number of training runs). Eliminating underperforming algorithms may prevent waste of resources on executing algorithms that may not ultimately be selected or utilized.

Figure 10:
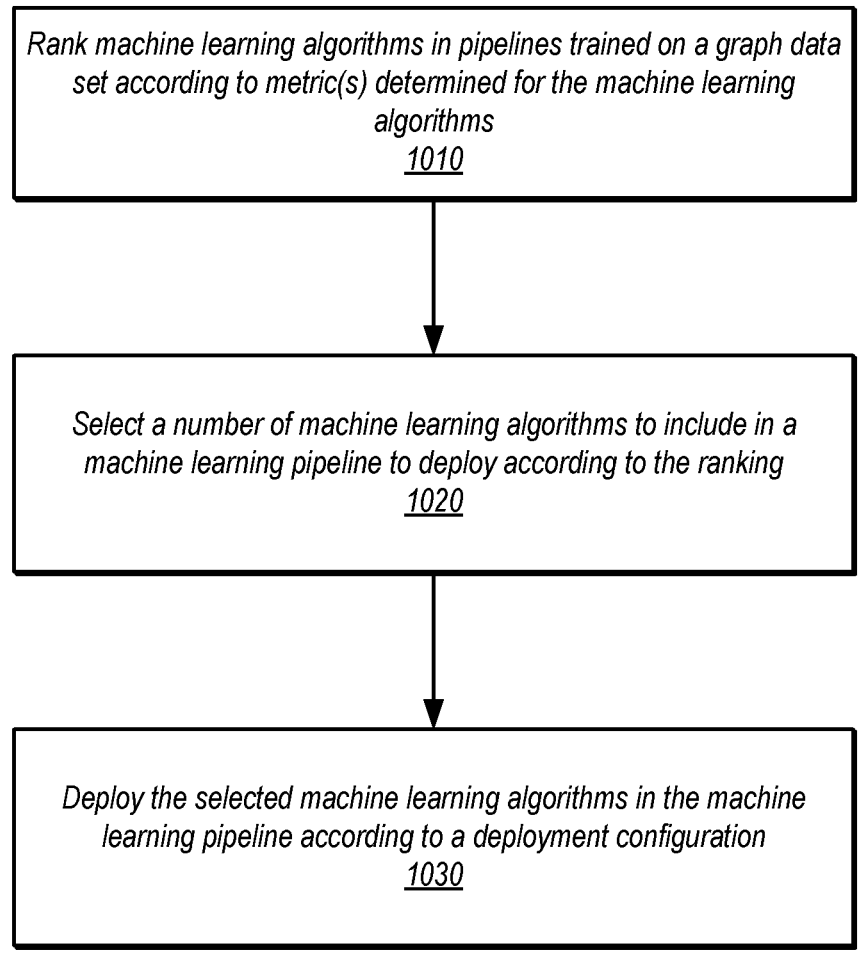
FIG. 10 illustrates a high-level flowchart of various methods and techniques to implement selecting machine learning algorithms included in trained machine learning pipelines for graph data sets to deploy, according to some embodiments.

Deployment of machine learning pipelines trained on graph data sets may be manually requested and performed, in some embodiments. Automation of deployment, however, may offer further performance benefits in, for instance, scenarios, where a new machine learning algorithm may be automatically deployed to replace an older version of the trained machine learning algorithm, and thus provide an automatic system update for a system that uses the trained pipeline. FIG. 10 illustrates a high-level flowchart of various methods and techniques to implement selecting trained machine learning algorithms for graph data sets to deploy, according to some embodiments.

As indicated at 1010, machine learning algorithms in pipelines trained on a graph data set may be ranked according to metric(s) determined for the machine learning algorithms, in some embodiments. For example, a leaderboard or other interface/display of trained machine learning algorithms (e.g., completed or in progress) may be ordered according to the ranking. Various types of evaluation metrics, such as maximum a posteriori (MAP) or precision at k documents (precision@k), may be determined or used to rank the machine learning algorithms.

As indicated at 1020, a number of machine learning algorithms may be selected to deploy according to the ranking, in some embodiments. For example, a single top algorithm may be selected or a number of top algorithms (e.g., top 3) may be selected. The selected machine learning algorithms may then be deployed in the machine learning pipeline according to a deployment configuration, in some embodiments, as indicated at 1030. For example, deployment configuration may identify a destination of host resources, to store the machine learning pipeline and/or various operations to configure, prepare, or otherwise ready the host resources for the machine learning pipeline and included machine learning algorithm(s) (e.g., software applications to install, configure, network configuration, hardware settings, etc.). The deployment configuration may be specified via an interface for the model training system in some embodiments (e.g., as discussed above with regard to FIG. 3).

The methods described herein may in various embodiments be implemented by any combination of hardware and software. For example, in one embodiment, the methods may be implemented on or across one or more computer systems (e.g., a computer system as in FIG. 11) that includes one or more processors executing program instructions stored on one or more computer-readable storage media coupled to the processors. The program instructions may implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 11:
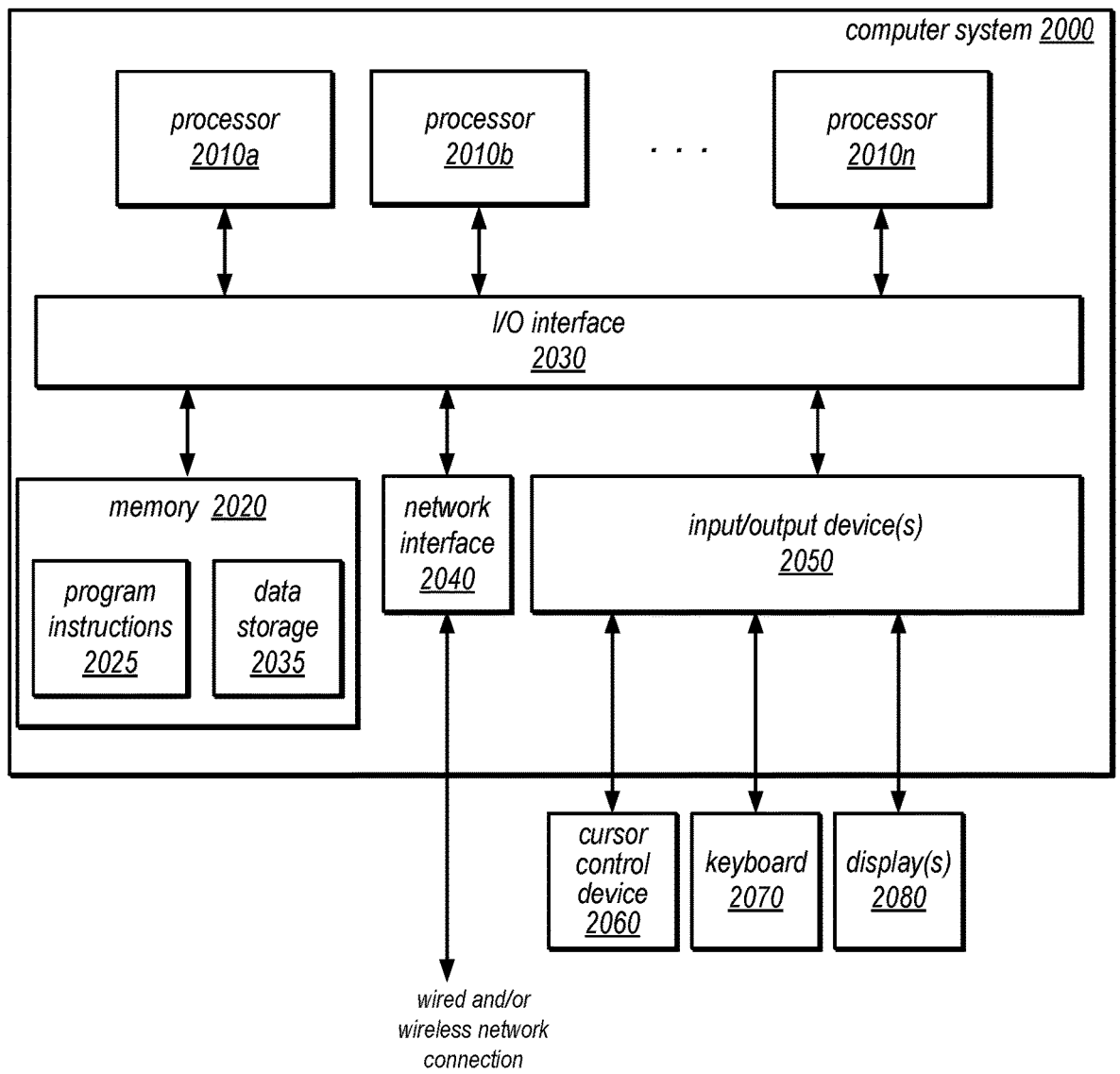
FIG. 11 illustrates an example system to implement the various methods, techniques, and systems described herein, according to some embodiments.

Embodiments of orchestration for building and executing machine learning pipelines for graph data sets as described herein may be executed on one or more computer systems, which may interact with various other devices. One such computer system is illustrated by FIG. 11. In different embodiments, computer system 2000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing device, computing node, compute node, or electronic device.

In the illustrated embodiment, computer system 2000 includes one or more processors 2010 coupled to a system memory 2020 via an input/output (I/O) interface 2030. Computer system 2000 further includes a network interface 2040 coupled to I/O interface 2030, and one or more input/output devices 2050, such as cursor control device 2060, keyboard 2070, and display(s) 2080. Display(s) 2080 may include standard computer monitor(s) and/or other display systems, technologies or devices. In at least some implementations, the input/output devices 2050 may also include a touch- or multi-touch enabled device such as a pad or tablet via which a user enters input via a stylus-type device and/or one or more digits. In some embodiments, it is contemplated that embodiments may be implemented using a single instance of computer system 2000, while in other embodiments multiple such systems, or multiple nodes making up computer system 2000, may host different portions or instances of embodiments. For example, in one embodiment some elements may be implemented via one or more nodes of computer system 2000 that are distinct from those nodes implementing other elements.

In various embodiments, computer system 2000 may be a uniprocessor system including one processor 2010, or a multiprocessor system including several processors 2010 (e.g., two, four, eight, or another suitable number). Processors 2010 may be any suitable processor capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

In some embodiments, at least one processor 2010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions that execute on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 2020 may store program instructions and/or data accessible by processor 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions of various machine learning pipeline building systems, such as those implemented as part of a machine learning service or graph database system or service that implements orchestration for building and executing machine learning pipelines for graph data sets, such as those described above may be stored within system memory 2020 as program instructions 2025 and data storage 2035, respectively. In other embodiments, program instructions and/or data may be received, sent or stored upon different types of computer-accessible media or on similar media separate from system memory 2020 or computer system 2000. Generally speaking, a non-transitory, computer-readable storage medium may include storage media or memory media such as magnetic or optical media, e.g., disk or CD/DVD-ROM coupled to computer system 2000 via I/O interface 2030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 2040.

In one embodiment, I/O interface 2030 may coordinate I/O traffic between processor 2010, system memory 2020, and any peripheral devices in the device, including network interface 2040 or other peripheral interfaces, such as input/output devices 2050. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. In addition, in some embodiments some or all of the functionality of I/O interface 2030, such as an interface to system memory 2020, may be incorporated directly into processor 2010.

Network interface 2040 may allow data to be exchanged between computer system 2000 and other devices attached to a network, such as other computer systems, or between nodes of computer system 2000. In various embodiments, network interface 2040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2050 may, in some embodiments, include one or more display terminals, keyboards, keypads, touchpads, scanning devices, voice or optical recognition devices, or any other devices suitable for entering or retrieving data by one or more computer system 2000. Multiple input/output devices 2050 may be present in computer system 2000 or may be distributed on various nodes of computer system 2000. In some embodiments, similar input/output devices may be separate from computer system 2000 and may interact with one or more nodes of computer system 2000 through a wired or wireless connection, such as over network interface 2040.

As shown in FIG. 11, memory 2020 may include program instructions 2025, that implement the various methods and techniques as described herein, and data storage 2035, comprising various data accessible by program instructions 2025. In one embodiment, program instructions 2025 may include software elements of embodiments as described herein and as illustrated in the Figures. Data storage 2035 may include data that may be used in embodiments. In other embodiments, other or different software elements and data may be included.

Those skilled in the art will appreciate that computer system 2000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 2000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 2000 may be transmitted to computer system 2000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may describe various operations that other systems may invoke, and may describe a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   at least one processor; and
   a memory, storing program instructions that when executed by the at least one processor, cause the at least one processor to:
   receive, via an interface for a machine learning service, a request for one or more machine learning pipelines that use a graph data set stored in a graph database, wherein the graph data set is stored as a graph data structure that models a plurality of data values as nodes and respective relationships between the plurality of data values as one or more edges between the plurality of nodes;
   access, by the machine learning service, the graph data set in the graph database using a graph traversal interface of the graph database to automatically generate a profile of the graph data set from one or more characteristics determined from the graph data set, the profile comprising a graph type based on a number of node types and a number of edge types used in the graph data set;

select, by the machine learning service, one or more machine learning algorithms for the graph data set based, at least in part, on the profile of the graph data set;

generate, by the machine learning service, an execution plan for the one or more machine learning pipelines that use the graph data set, wherein the execution plan is generated according to the one or more machine learning algorithms;

execute, by the machine learning service, the one or more machine learning pipelines using the graph data set according to the execution plan; and deploy, by the machine learning service, the one or more machine learning pipelines to a destination specified via the interface.

2. The system of claim 1, wherein the memory stores additional program instructions that when executed by the least one processor, cause the at least one processor to:

receive, via the interface, a modification to the profile of the graph data set; and update, by the machine learning service, the profile of the graph data set according to the modification before the selection of the one or more machine learning algorithms for the graph data set.

3. The system of claim 1, wherein the memory stores additional program instructions that when executed by the least one processor, cause the at least one processor to:

determine, by the machine learning service, one or more machine learning algorithm constraints for the graph data set;

identify, by the machine learning service, one or more candidate machine learning algorithms that satisfy the one or more machine learning algorithm constraints;

rank, by the machine learning service, the one or more candidate machine learning algorithms according to a respective historical performance of the one or more candidate machine learning algorithms; and provide, by the machine learning service, the one or more candidate machine learning algorithms according to the ranking.

4. The system of claim 1, wherein to generate the execution plan for the one or more machine learning pipelines on the graph data set, the program instructions cause the at least one processor to modify an initial execution plan to combine one or more operations in the initial execution plan with results that can be shared.

5. A method, comprising:

receiving, via an interface for a machine learning pipeline building system, a request for one or more machine learning pipelines that use a graph data set, wherein the graph data set is stored as a graph data structure that models a plurality of data values as nodes and respective relationships between the plurality of data values as one or more edges between the plurality of nodes, wherein the graph data set is stored in a graph database;

generating, by the machine learning pipeline building system, a profile of the graph data set comprising one or more characteristics determined from the graph data set by the model training system using a graph traversal interface of the graph database to access the graph data set in the graph database, the profile comprising a graph type based on a number of node types and a number of edge types used in the graph data set;

determining, by the machine learning pipeline building system, an execution plan for the one or more machine learning pipelines that use the graph data set, wherein the execution plan is determined using one or more machine learning algorithms identified for the graph data set based, at least in part, on the profile of the graph data set; and executing, by the machine learning pipeline building system, the one or more machine learning pipelines that use the graph data set according to the execution plan.

6. The method of claim 5, further comprising:

determining, by the machine learning pipeline building system, one or more machine learning algorithm constraints for the graph data set;

identifying, by the machine learning pipeline building system, one or more candidate machine learning algorithms that satisfy the one or more machine learning algorithm constraints;

ranking, by the machine learning pipeline building system, the one or more candidate machine learning algorithms according to a respective historical performance of the one or more candidate machine learning algorithms; and providing, by the machine learning pipeline building system, the one or more candidate machine learning algorithms according to the ranking.

7. The method of claim 6, wherein the one or more candidate machine learning algorithms are provided via the interface and wherein the method further comprises receiving a selection of the one or more machine learning algorithms from the one or more candidate machine learning algorithms via the interface before determining the execution plan for the one or more machine learning pipelines.

8. The method of claim 5, wherein determining the execution plan for the one or more machine learning pipelines on the graph data set comprises ordering operations in the execution plan according to determined dependencies and processing costs of the operations.

9. The method of claim 5, wherein generating the profile of the graph data set comprises sending, by the machine learning pipeline building system, one or more requests to access the graph data set in the graph database.

10. The method of claim 9, wherein the one or more requests to access the graph data set obtain a sample of the graph data set to determine at least one of the one or more characteristics.

11. The method of claim 5, further comprising:

wherein the method further comprises:

after executing the one or more machine learning pipelines according to the execution plan:

ranking, by the machine learning pipeline building system, the one or more machine learning algorithms used to determine the one more machine learning pipelines according to one or more respective metrics determined for the one or more machine learning algorithms;

selecting, by the machine learning pipeline building system, the one or more machine learning algorithms according to the ranking; and deploying, by the machine learning pipeline building system, the selected one or more machine learning algorithms as part of the one or more machine learning pipelines according to a deployment configuration specified via the interface.

12. The method of claim 5, wherein executing the one or more machine learning pipelines that use the graph data set according to the execution plan comprises accessing one or more data objects external to the graph data set and referenced in the graph data set.

13. The method of claim 5, wherein the machine learning pipeline building system is implemented as part of a machine learning service and wherein the interface is a Graphical User Interface (GUI).

14. One or more non-transitory, computer-readable storage media, storing program instructions that when executed on or across one or more computing devices cause the one or more computing devices to implement:
   receiving, via an interface, a request for one or more machine learning pipelines that use a graph data set, wherein the graph data set is stored as a graph data structure that models a plurality of data values as nodes and respective relationships between the plurality of data values as one or more edges between the plurality of nodes, wherein the graph data set is stored in a graph database;
   evaluating the graph data set to generate a profile of the graph data set from one or more characteristics determined from the graph data set using a graph traversal interface of the graph database to access the graph data set in the graph database, the profile comprising a graph type based on a number of node types and a number of edge types used in the graph data set;
   identifying one or more machine learning algorithms for the graph data set based, at least in part, on the profile of the graph data set;
   generating an execution plan for the one or more machine learning pipelines that the graph data set, wherein the execution plan is generated according to the one or more machine learning algorithms; and
   causing the execution plan to be performed.

15. The one or more non-transitory, computer-readable storage media of claim 14, storing further program instructions that when executed on or across the one or more computing devices, cause the one or more computing devices to further implement:
   determining one or more machine learning algorithm constraints for the graph data set; and
   wherein the identified one or more machine learning algorithms satisfy the one or more machine learning constraints.

16. The one or more non-transitory, computer-readable storage media of claim 14, wherein in generating the execution plan for the one or more machine learning pipelines that use the graph data set, the program instructions cause the one or more computing devices to implement modifying an initial execution plan to order operations in the initial execution plan to be performed in parallel.

17. The one or more non-transitory, computer-readable storage media of claim 14, storing further program instructions that when executed on or across the one or more computing devices, cause the one or more computing devices to further implement deploying the one or more machine learning pipelines to one or more hosts to serve requests using the one or more machine learning pipelines.

18. The one or more non-transitory, computer-readable storage media of claim 14, wherein at least one of the one or more machine learning pipelines includes an embedding.

19. The one or more non-transitory, computer-readable storage media of claim 14, storing further program instructions that when executed on or across the one or more computing devices, cause the one or more computing devices to further implement:
   receiving, via the interface, a modification to the profile of the graph data set; and
   updating the profile of the graph data set according to the modification before the identification of the one or more machine learning algorithms for the graph data set.

20. The one or more non-transitory, computer-readable storage media of claim 14, wherein the one or more computing devices are implemented as part of the graph database that stores the graph data set.

* * * * *